Jan. 26, 1960 V. R. WITT ET AL 2,922,231

MAGNETIC TRANSDUCER

Filed April 26, 1956 2 Sheets-Sheet 1

INVENTORS
VICTOR R. WITT
REX C. BRADFORD
BY
Harry T. Berriman
AGENT

United States Patent Office 2,922,231

Patented Jan. 26, 1960

2,922,231

MAGNETIC TRANSDUCER

Victor R. Witt, Poughkeepsie, and Rex C. Bradford, Wappinger Falls, N.Y., assignors to International Business Machines Corporation, New York, N.Y., a corporation of New York Application April 26, 1956, Serial No. 580,894

2 Claims. (Cl. 340—174)

This invention relates to magnetic recording and reproducing apparatus and more particularly to the magnetic heads or transducers by which magnetic representations are imparted to a magnetizable storage medium and by which the magnetic representations are read from the storage medium.

It is the usual practice to record magnetic representations of data or other intelligence on a suitable recording medium by moving the medium past a recording head, the head being actuated under the control of suitable external circuitry so as to impart the desired magnetic configuration to the recording medium. The recording head may be of the so-called plural track type having a number of individual recording sections which are arranged laterally to the direction of movement of the storage medium and each adapted to record in a related one of a number of parallel storage tracks of the storage medium. The individual recording sections may be operated singly or in combination at any desired recording position of the storage medium, so as to impart magnetic representations of data to the recording medium in a combinational coded form. The stored coded magnetic representations of data may be subsequently read from the storage medium and utilized to operate suitable external circuitry, by the movement of the storage medium past a plural track magnetic reading device.

It is advantageous in certain applications such as the storing and reading of coded magnetic representations of digital data, that each item of data after being stored, is read and checked for accuracy of recording as soon as possible after recording. The checking of the accuracy of recording may be made in well known ways such as by a "bit" count check wherein each possible element of information in the chosen combinational code arrangement is predetermined to have an odd or even number of binary one representations or "bits," as desired. If in the reading of a recorded element, the bit count differs from the preset norm, a recording error is presupposed. It is appreciated that the closer the reading head may be physically spaced to the recording head, the sooner record errors can be detected so that the time lapse in backing up the tape and re-recording the data again from and including the error point on, is correspondingly minimized. The distance between records is also minimized as we now cannot stop the tape motion until the read verification is completed. In an arrangement as visualized above it is evident that recording of elements of information will be effected simultaneously with the reading of previously recorded elements of information.

With simultaneous read-record operations, the closer the read and record heads are together, the greater the interference therebetween and the greater the probability that the recording process will interfere with the reading process to such an extent that erroneous reading will be effected. It is thus seen that simultaneous operation of a recording and a reading device is antagonistic to a desired close spacing of the devices to facilitate rapid error detection and correction. These apparently divergent characteristics of simultaneous record-read and close spacing have been overcome in the subject invention by the provisions of a unique barrier between the two heads for trapping any magnetic field effects of the record head before they can interfere with the read sections. It is accordingly a principal object of the invention to provide a magnetic transducer having both record and read sections which are physically very close together and yet may be operated simultaneously with no interference therebetween.

It is another object of the invention to provide a magnetic transducer with record and read sections which are physically very close together and yet are magnetically shielded from each other so effectively that with both record and read sections operating simultaneously, the recording section does not interfere with the reading section.

It is a further object of the invention to provide a magnetic transducer with record and read sections which are physically very close together and are magnetically shielded from each other by a unique construction comprised of a pair of nonmagnetic barriers and an intervening highly magnetizable barrier.

It is a further object to provide a magnetic transducer with record and read sections which are physically very close together and are magnetically shielded from each other by a unique construction comprised of a member of parallel highly magnetizable barriers spaced by intervening nonmagnetic but electrostatic barriers.

It is a further object of the invention to provide a magnetic transducer having independent recording and reading magnetic circuits each including an operational gap, the gaps being physically arranged very close to each other but magnetically shielded from each by a shunt magnetic path arranged therebetween.

It is a further object of the invention to provide a transducer having recording reading sections arranged physically within the general range of ¼ inch from each other, said sections being adapted for cooperation with a moving magnetizable record, areas of which are presented first to one of said sections, and subsequently to the other section for magnetic cooperation therewith, each of said sections being adapted to operate simultaneously in cooperation with the corresponding area of said record, but independently of the adjacent section and with no interaction therewith.

Other objects of the invention will be pointed out in the following description and claims and illustrated in the accompanying drawings, which disclose, by way of example, the principle of the invention and the best mode, which has been contemplated of applying that principle.

In the drawings:

Fig. 5 may be considered as illustrating the same structure as Fig. 4.

Figure 1:
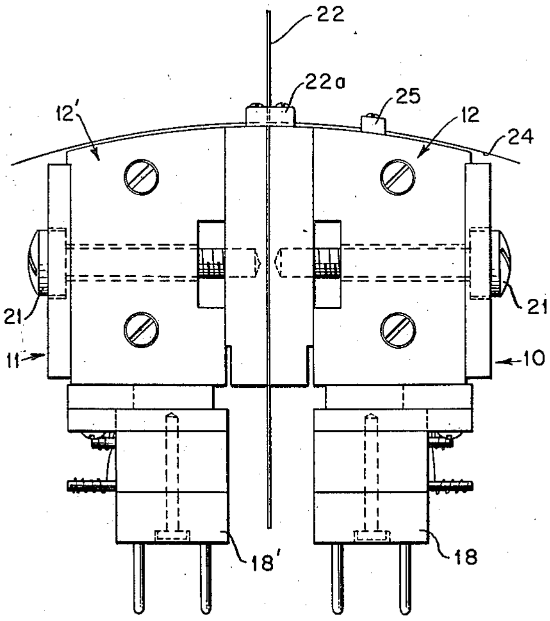
Fig. 1 is a side elevation view of the transducer.
Figure 2:
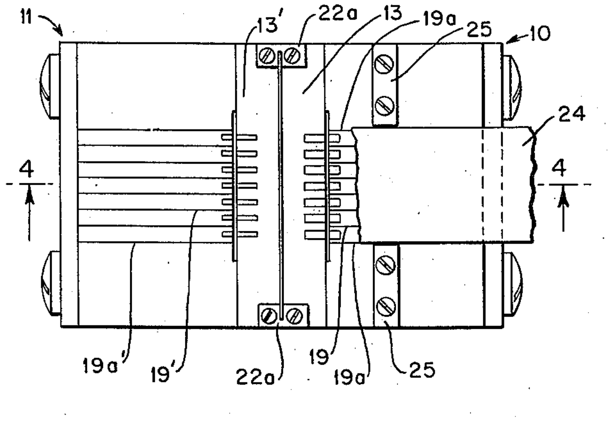
Fig. 2 is a plan view of the transducer.

Referring now to Figs. 1 and 2, the transducer comprises a right hand recording section or head, generally designated 10, and a left hand reading section or head, generally designated 11. Each of the heads 10 and 11 is substantially a mirror image of the other with a few exceptions as will be particularly noted. The following description will therefore be confined to the recording head whenever practical. Corresponding portions of both heads will be labeled with similar reference numerals with the provision that the common reference numerals will be differentiated from each other or the drawings with reference to the recording and reading heads, by the addition of a prime ′ to the reference numbers as applied to the reading head 11. The embodiment of the invention shown is indicated as adapted for use with elongated oxide recording tape, however, it will be obvious that the inventive principle of the transducer would apply equally to use with magnetic drum storage mediums, magnetic wire storage mediums, and so forth. The embodiment of the invention shown is also indicated as being a plural track (7) device, however, it may obvious be a single track device, if desired or required.

Figure 4:
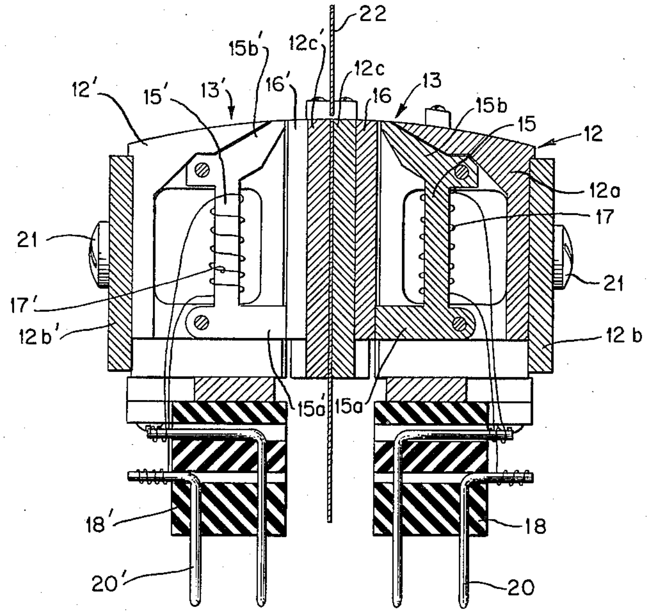
Fig. 4 is a vertical section view taken on the plane of the line 4—4 of Fig. 2.

Referring to the figures, the recording head 10 comprises a housing 12 of brass or other suitable nonmagnetic material, the housing having seven spaced cavities therein in each of which there is arranged a core assembly generally designated 13 in Figs. 2 and 4, the housing 12 actually includes various sections **12*a*, 12*b* and 12*c* as indicated. Each of the core assemblies 13 comprises a core structure of a high permeability magnetic material such as mu metal and which is thin and flat in cross section. Each core structure comprises a roughly I shaped main body member 15 and a rectangular shaped member 16. The member 16 is brought into intimate contact at its lower end (see Fig. 4) with the one end of a base arm 15*a* of the I shaped member 15 so as to form a continuous magnetic path therebetween. A top arm 15*b* (see Fig. 4) of the I shaped member 15 extends upwardly and toward, but does not actually engage the member 16 at its upper end. These two proximate sections or core tips are accurately spaced about .0005 inch from each other by a strip of suitable nonmagnetic and nonconductive material such as mylar so as to provide a uniform nonmagnetic gap area. It is thus evident that there is a continuous magnetic path for each core structure from the nonmagnetic gap area, through the core tip area of associated member 16, through the main body of member 16 to the lower end thereof, through the adjacent base arm 15*a* of the associated I shaped member 15, through the central body of member 15 and the upper core tip arm 15*b*** thereof to the nonmagnetic gap area.

A winding 17 is wrapped around the central body of member 15 of each core structure. The windings 17 of the recording head differ from the windings of the reading head in that they are center tapped. The winding end leads, and in the case of the recording head winding a lead also connected to the center tap point thereof, extend from each core assembly 13 through suitable openings in the related housing 12, through a terminal block 18 formed of an insulating material and rigidly attached to the related housing 12, and finally to the upper end of a corresponding electrically conductive terminal 20, each terminal being imbedded in and rigidly supported by the related terminal block 18. It will be noted that the lower end of each of the terminals 20 extends beyond the lower surface of the terminal block 18 for that head, the terminal and terminal block 18 thus forming a pluggable terminal structure. A suitable mating socket structure (not shown) is provided for the pluggable terminal structure of each head, and by plugging the terminal structure into the related socket structure, the windings of the two heads may be connected therethrough to suitable external control circuitry.

Referring now to Fig. 2 it will be noted that there is also arranged in the brass housing 12 of the recording head 10 between adjacent I shaped body members of each core assembly a continuous shield wafer—formed of the same magnetic material as the core assemblies. In addition to the shield wafers provided between adjacent core assemblies, similar wafers **19*a* are provided for the outer side of the two endmost core assemblies as indicated in Fig. 2. A similar wafer shielding arrangement is provided for the reading head 11** as will be noted in Fig. 2.

The recording and reading heads 10 and 11, respectively are rigidly secured to each other positioned as indicated in the figures by suitable brass screw fastenings 21 extending between the brass housings 12 and 12′ of each head, or in any other suitable manner. As the sections are brought together there is arranged therebetween a thin sheet 22 of a high permeability magnetic material such as mu metal, it being noted that the sheet extends to and beyond the bottom (in Fig. 3) of the transducer. The sheet 22 also extends above the upper surface of the top of the transducer as indicated. As will be best evident from Fig. 3, it will be noted that with the recording and reading heads assembled so as to form the transducer, there is actually a sandwich like structure between the rectangular core members 16 and 16′ of the two heads. The sandwich structure comprises, proceeding in the direction from the recording head to the reading head, the brass section **12*c* of the housing 12, the sheet 22 and the brass section 12*c*′ of the housing 12′**.

Figure 3:
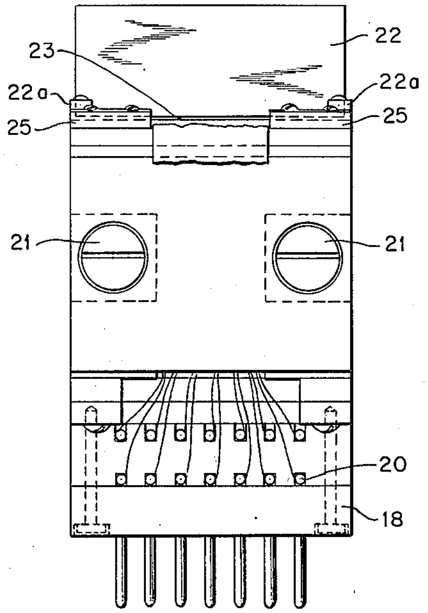
Fig. 3 is an end elevation view of the transducer.

Referring now to Fig. 3 it will be noted that the sheet 22 contains a slot 23, the lower edge of the slot being flush with the upper surface of the tranducer. The slot 23 is in the range of 10 thousandths of an inch in height and is of a length sufficient to accommodate an oxide coated tape 24 (see Figs. 1 and 2) utilized with the transducer. Secured to the top of the recording head housing 12 is a pair of spaced tape guides 25. The tape 24 is adapted for lengthwise movement, by the action of any well known tape movement apparatus between the tape guides 25 and across the upper surface of the recording head 11, through the tape slot 23, and across the top surface of the reading head. The core tips and the intervening gap of the seven recording head core assemblies are flush with the upper surface of the recording head, as best indicated in Fig. 3, and extend transversely to the direction of movement of the tape and are thus adapted for cooperation with what may be considered a related longitudinally extending recording track on the channel of the tape.

Although the sheet 22 has been described as being one continuous sheet, it may be actually formed in two sections and is so indicated in the drawings, to facilitate manufacture and permit the tape contact surface of the transducer to be ground after the recording and reading sections are assembled. In such an arrangement a lower section of the sheet is placed between the heads as assembled and the top thereof ground flush with the tape contact surface during the grinding of the latter. Thereafter the upper section of the sheet is positioned above the tape path and suitably supported at its lower edges on the transducer by brass supports such as **22*a*. The upper sheet is supported so as to provide the desired tape clearance opening 23** between it and its associated lower section.

Referring to Fig. 4 it will be recalled that the winding 17 associated with each of the recording head core assemblies is center tapped. The center tap of each such winding is connected to ground. By passing a current from one of the winding ends through the related section of the winding to the grounded center tap, a flux of one direction is generated in the core assembly and of course across the associated recording gap to correspondingly magnetically effect the adjacent magnetizable area of the associated "track" of the tape. Similarly by passing a current from the other end of the winding to the center tap a reverse flux is generated. The recording head arrangement indicated is utilized in a so-called NRZ system (non return of flux to zero). In the NRZ system, current is continuously passing from one of the winding ends or the other to the center tape to generate a flux field. A steady flux field is representative of a binary zero indication. A binary one is represented by a reversal of the flux from either of its two possible directions. It is the reversal of the flux and not the final direction thereof that is significant. After the reversal, the flux will of course be steady but in an opposite direction to its original direction. The flux passes through zero in a reversal in flux but does not ever return to zero flux as a steady state condition. Suitable external control circuitry for the recording head is operable in a well known manner so as to selectively control the winding currents through the core windings in accordance with the coded representation of the particular character it is desired to record on the tape at any particular recording position. The application of the transducer to the NRZ system is only representative, however, and it will be appreciated that other systems of recording may be used, if desired.

In the same fashion as the recording head, the core tips and intervening gaps of the seven reading head core assemblies are flush with the upper surface of the reading head, and extend transversely to the direction of movement of the tape. Each of the reading head core assemblies is substantially aligned with a related one of the recording head assemblies and is accordingly adapted to read the magnetic data representation previously recorded on the "track" of tape associated with that recording head assembly. With a steady state or binary zero representation magnetized area (in the NRZ system) passing a reading head, a corresponding steady flux is produced therein. As a magnetized area having a changing flux on representation of a binary core passes a read gap, it produces a rate of change of flux in the associated core, which, in turn generates an electric voltage in the related winding 17. This induced voltage is applied from the winding through the pluggable terminal structure previously described to suitable external amplifying circuitry to generate an electrical manifestation of the magnetic data read. It will be noted that the recording width of recording head core assemblies exceeds the reading width of the related reading head core assembly. With this arrangement of wide record and narrow read reading, error due to any reasonable skew or displacement of the tape to either side of its normal longitudinal movement path are eliminated. This wide record narrow read arrangement also permits the alignment of the associated pairs of recording core assemblies and reading core assemblies to be less critical thus simplifying the machining and assembly procedures in manufacturing the transducer. The wide record narrow read feature is also advantageous when reading tapes on a machine and head combination other than the ones used to record the data originally.

Figure 5:
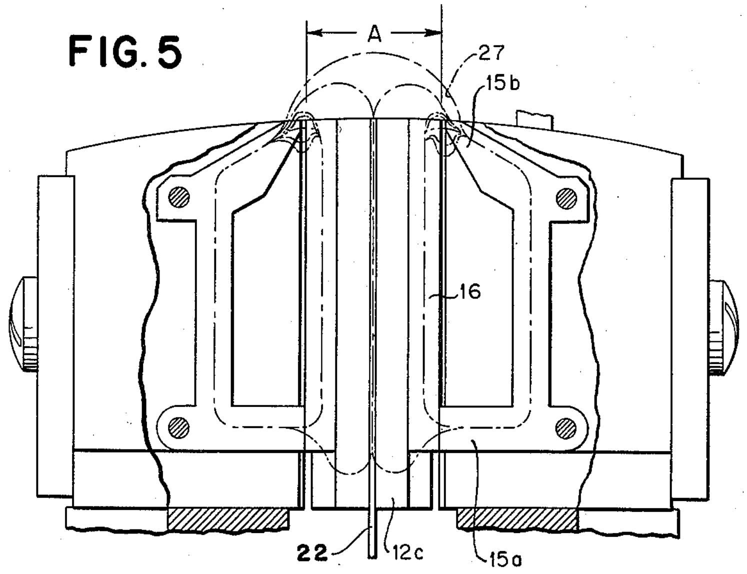
Fig. 5 is a diagrammatic representation of the magnetic flux lines present in an associated pair of recording and reading core assemblies during simultaneous operation thereof.

Referring now particularly to Fig. 5, there will be described the manner in which the above described transducer arrangement permits both the recording and reading head sections to be physically positioned very close together and yet be operated simultaneously without the stronger flux field radiated by the recording head interfering with the relatively weak flux field of the reading head. With the transducer arrangement as indicated in the figures, the spacing A (Fig. 5) between the read gap and the record gap, may be in the range of ¼ inch. During a recording operation the flux generated by each core is concentrated in the low reluctance magnetic path previously traced from the upper or core tip end of the associated member 16, through member 16, through base arm **15*a* of member 15, through the control portion of member 15, through the arm 15*b* to the core tip thereof, and through the recording gap to member 16**, the flux being either in a forward or reverse direction in the above path dependent upon which half of the winding is energized. Since the reluctance of the gap is greater than the remainder of the above traced path, the magnetic flux tends to fan out at the core tips.

With the magnetic tape 13 adjacent the transducer, a large part of the flux field in the record gap, is concentrated in the adjacent magnetizable area of the tape, thus imparting the characteristic of the recording field to the tape at that point. That portion **12*c* of the brass (nonmagnetic) housing adjacent the rectangular core member 16 acts as a barrier to further confine the recording flux field in the above traced path. However, in spite of the nonmagnetic barrier 12*c*, some of the flux line as represented by reference number 27 of the recording flux field does extend in a direction toward the reading head magnetic path. This flux is not permitted to reach the reading head because it encounters the very low reluctance path of the sheet 22, and is accordingly concentrated therein and shunted back to the main magnetic path of the associated recording head core assembly. The combined shielding effect of the nonmagnetic barrier 12*c* and the shunt magnetic path provided by the sheet 22, is effective to prevent interference of a recording field flux with the related reading core assembly and vice versa, as indicated. Anyone or combinations of the core assemblies of both reading and recording may accordingly be operating simultaneously. The nonmagnetic and conductive barrier 12*c* and 12*c'* adjacent the magnetic sheet 22** provide electrostatic shielding between the two head sections, since the recording operation in addition to generating a magnetic flux, also has an electrostatic field effect.

The transverse barriers 19 and **19*a* and the brass portions of the housing between adjacent recording head assemblies function in a similar fashion to prevent undue interference between the recording fields of adjacent core assemblies. However, this latter shielding action is not as critical as the action between the recording and reading assemblies themselves, and accordingly does not require an all extensive arrangement as between the recording and reading assemblies. The transverse barriers 19', 19*a'*** and the associated brass portions in the reading head likewise magnetically isolate adjacent reading head core assemblies to minimize signal transference therebetween.

The overall result of the above described construction is to provide a transducer having independent recording and reading sections which are physically arranged with their operational air gaps spaced within the range of ¼ inch from each other, and wherein the recording section may be operated to record magnetic representations of data on a magnetizable medium such as a tape, wire, or drum, without interfering with the operation of the reading section which is simultaneously reading previously recorded data from the storage medium.

It should be mentioned that although the representative transducer is indicated as constructed of separate read and record sections, each of which is arranged in an associated brass housing, the sections then being secured together to form the transducer, the transducer could be fabricated by arranging the recording and reading section elements and the shielding apparatus in a suitable mold whereafter, a suitable plastic, nonmagnetic material could be cast around the elements to form the finished transducer. The recording and reading sections could be cast separately and then joined together in any suitable fashion, or they could be cast together as an entire unit. The manner of fabrication of the transducer shown in the figures, or the manner of fabrication as mentioned immediately heretofore are, of course, only two possible fabrication procedures of many possible such procedures which would be obvious to one skilled in the art.

Figure 6:
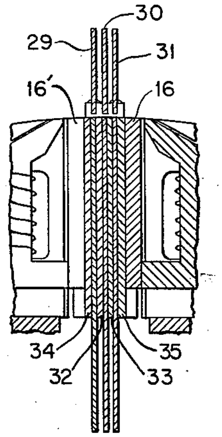
Fig. 6 is a fragmentary view of an alternate species of the improved transducer.

Referring now to Fig. 6 there is shown an alternate construction for the magnetic and electrostatic shielding provided between the recording and reading sections of the transducer. The shielding arrangement indicated in Fig. 6 is essentially similar to that previously described except that instead of comprising only a single magnetic barrier and an adjacent pair of nonmagnetic and electrically conductive barriers, there is provided a plurality of such magnetic barriers which are arranged parallel to and spaced from each other by intervening nonmagnetic and electrically conductive barriers. Thus in the specific embodiment indicated in Fig. 6, there is provided 3 magnetic barriers 29, 30, and 31 which are separated by nonmagnetic and electrically conductive barriers 32 and 33, the outer barriers 29 and 31 also being separated from the adjacent legs 16 and 16' of the core assemblies by nonmagnetic and electrically conductive barriers 34 and 35. It will be noted that the barriers 29, 30 and 31 not only extend between the core assemblies but also extend above the tape movement path. The portion of the barriers above the tape may be integral with the aligned barrier section between the core assemblies or may be independent thereof as actually indicated, in the same fashion as previously described for the other embodiment of the improved transducer, the extending portions of the magnetic barriers above the tape may be separated by air, as indicated, or by nonmagnetic and electrically conductive barriers in the same fashion as the lower sections of the magnetic barriers.

While there have been shown and described and pointed out the fundamental novel features of the invention as applied to a preferred embodiment, it will be understood that various omissions and substitutions and changes in the form and details of the device illustrated and its operation may be made by those skilled in the art without departing from the spirit of the invention. It is the intention therefore to be limited only as indicated by the scope of the following claims.

What is claimed is:

1. A recording and reading transducer for permitting simultaneous recording and reading in closely spaced storage areas of a traveling magnetizable record medium, said transducer comprising, in combination, a recording device including, a magnetic core structure having a first elongated core section and a second elongated core section extending parallel to said first section but spaced therefrom, said second section including an extending arm at each end, one arm engaging the adjacent end of said first core section and the other arm extending toward but not engaging the other end of said first core section to define an operational nonmagnetic recording gap portion adapted to be bridged by a traveling magnetizable record medium passed thereover, an operational coil inductively associated with a portion of said core structure, a reading device substantially identical to said recording device and having a non-magnetic reading gap portion, nonmagnetic means supporting said recording and reading devices with said first magnetic core section of each said recording and reading devices extending parallel to and accurately and closely spaced from each other in a face to face relationship, said devices being arranged relative to said traveling magnetizable record medium with predetermined storage areas thereof being presented successively to the recording and reading device operational gaps, and a sheet of highly magnetizable material extending between but spaced from said face to face core sections of said recording and reading devices, said sheet extending above the path of said traveling magnetizable record medium and including an opening therein through which said record medium travels in traversing successively said recording and reading gaps, said sheet shunting leakage flux of both of said gaps back to the related core section.

2. A recording and reading transducer for permitting simultaneous recording and reading in closely spaced storage areas of a traveling magnetizable record medium, said transducer comprising, in combination, a recording device including a magnetic core structure having a first elongated core section and a second elongated core section extending parallel to said first section but spaced therefrom, said second section including an extending arm at each end, one arm engaging the adjacent end of said first core section and the other arm extending toward but not engaging the other end of said first core section to define a nonmagnetic recording gap portion adapted to be bridged by a traveling magnetizable record medium passed thereover, an operational coil inductively associated with a portion of said core structure, nonmagnetic structure supporting said recording device with said gap area being exposed in an area of one surface of said supporting structure, and an outer face of said first core section being exposed in an area on another surface of said supporting structure, a nonmagnetic shim member arranged to cover said exposed face of said core section, a reading device substantially identical to said recording device and having a nonmagnetic reading gap, a thin sheet of highly magnetizable material, means for rigidly securing said recording and reading devices together in a mirror image relationship with said thin sheet being gripped between the surfaces of said nonmagnetic shim of each said devices, said devices being arranged relative to said traveling magnetizable record medium with predetermined areas thereof being presented successively to the recording and reading device gaps, said sheet extending beyond said adjacent shims in a direction above the path of said traveling magnetizable record medium and including an opening therein through which said medium travels in traversing successively said recording and reading gaps, said sheet serving as a common low reluctance shunt path for the leakage flux from both said recording and reading gaps.

References Cited in the file of this patent

UNITED STATES PATENTS

| | | |
|---|---|---|
| 2,563,850 | Lindsay | Aug. 14, 1951 |
| 2,565,191 | Zenner | Aug. 21, 1951 |
| 2,618,709 | Echert et al. | Nov. 18, 1952 |
| 2,658,114 | Buhrendorf | Nov. 3, 1953 |
| 2,700,588 | Williams | Jan. 25, 1955 |
| 2,763,729 | Camras | Sept. 18, 1956 |
| 2,769,036 | Selsted | Oct. 30, 1956 |
| 2,848,556 | Roys et al. | Aug. 19, 1958 |
| 2,871,464 | Wright et al. | Jan. 27, 1959 |